US005328307A

United States Patent [19]
Fees et al.

[11] Patent Number: 5,328,307
[45] Date of Patent: Jul. 12, 1994

[54] CUTTING TOOL FOR WORKING THE INTERIOR AND EXTERIOR CONTOURS OF WORKPIECES

[75] Inventors: Heiner Fees, Bietigheim-Bissingen; Manfred Goetz, Schwabach, both of Fed. Rep. of Germany

[73] Assignee: MAPAL Fabrik fur Prazisionswerkzeuge Dr. Kress KG, Aalen, Fed. Rep. of Germany

[21] Appl. No.: 977,439
[22] PCT Filed: Aug. 25, 1990
[86] PCT No.: PCT/DE90/00651
§ 371 Date: Feb. 24, 1993
§ 102(e) Date: Feb. 24, 1993
[87] PCT Pub. No.: WO91/03245
PCT Pub. Date: Mar. 5, 1992

[51] Int. Cl.$^5$ ............................................... B23C 5/24
[52] U.S. Cl. ..................................... 408/173; 407/37; 407/87; 408/185
[58] Field of Search ..................................... 407/36-39, 407/44, 45, 85-87, 93; 408/146, 147, 153, 173, 185, 199, 705, 186, 189-192, 197, 713

[56] References Cited

U.S. PATENT DOCUMENTS 3,286,557 11/1966 Rietzler et al. ............... 407/36 X
4,497,601 2/1985 Negus ........................... 408/185 X

FOREIGN PATENT DOCUMENTS 3201508 4/1983 Fed. Rep. of Germany.
2063732 6/1991 United Kingdom.

Primary Examiner—Steven C. Bishop

[57] ABSTRACT

A cutting tool of the specified type is to be miniaturized and configured in such a manner that it is suitable for working bores having a diameter of 6 mm and more and for high-speed work with revolving tools.

The solution according to the invention provides that the adjustment screws for radially adjusting the cutting plate simultaneously form a clamping means for the form-locking clamping of the cutting plate to the supporting shoulder of the basic tool body.

A preferred field of use are precision drills and grinding tools equipped with inserted cutting strips made of a highly wear resistant cutting material.

10 Claims, 2 Drawing Sheets

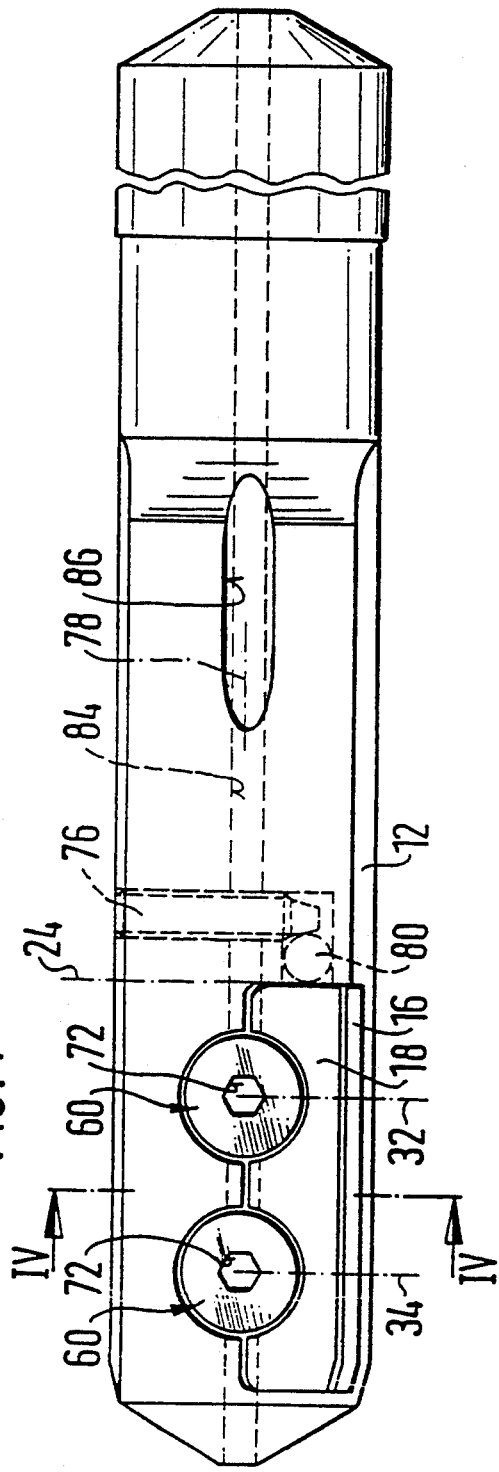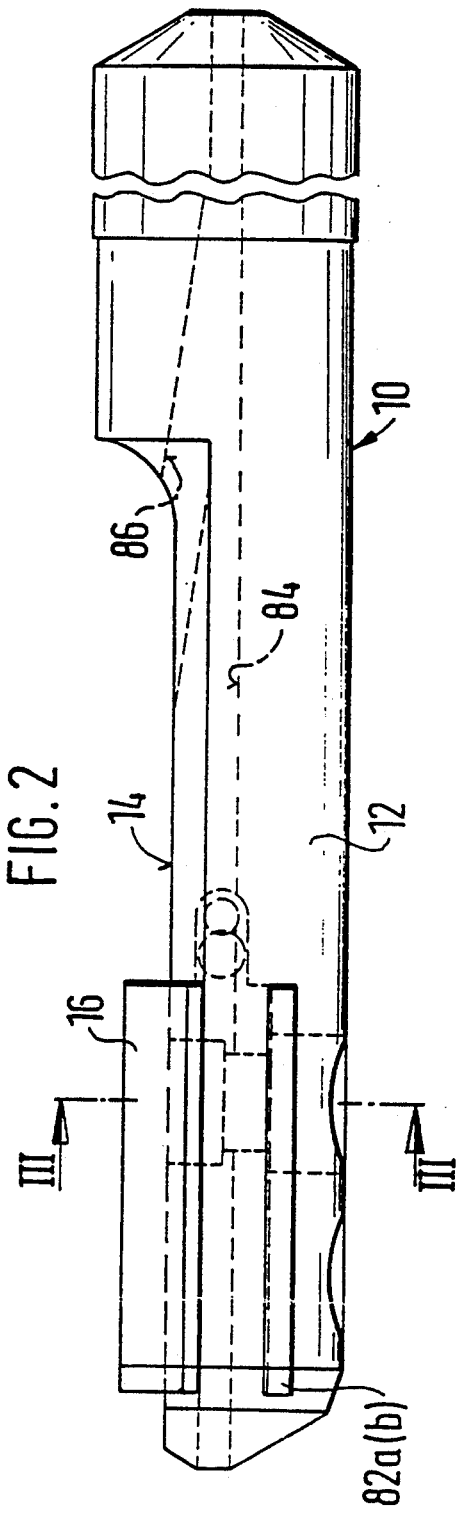

CUTTING TOOL FOR WORKING THE INTERIOR AND EXTERIOR CONTOURS OF WORKPIECES

BACKGROUND OF THE INVENTION

The invention is based on a cutting tool for working interior and exterior contours of workpieces, with the tool including at least one cutting plate exchangeably fastened to a basic tool body and being adjustable radially to the tool axis by means of at least one adjustment screw while being clampable by clamping means to a supporting shoulder of the basic tool body that absorbs the working pressure. In a prior art cutting tool of this type (German Patent 3,201,508), a separate screw element is provided to adjust the cutting plate and to clamp it tightly into the supporting shoulder of the basic tool body. The cutting plate is disposed at a clamping shoe which is supported in the basic tool body so as to be rotatable about an axis that is axially and radially offset relative to the cutting plate. The radial adjustment of the cutting plate relative to the tool axis is effected by rotating the clamping shoe relative to the basic tool body, with this inevitably also changing the angular position of the cutting plate relative to the tool axis. To clamp the cutting plate or cutting edge to the supporting shoulder of the basic tool body, the clamping shoe is pulled at a right angle against the supporting shoulder, whereupon the cutting plate is held at the basic tool body by a friction lock. This configuration requires a relatively large amount of space and is therefore unsuitable for tools with which very small bores are to be worked. Moreover, the prior art arrangement is also unsuitable for high-speed work because the cutting plate is not held in a form lock at the basic tool body to prevent it from radially escaping from the revolving tool.

SUMMARY OF THE INVENTION

The arrangement according to the invention concerns a cutting tool of the type discussed above where the radial adjustment of the cutting plate with respect to the tool axis, together with the clamping of the cutting plate to a supporting shoulder of the basic tool body, are simultaneously effected by means of at least one adjustment screw. The invention is thus distinguished by a particularly compact configuration in which, in principle, only one adjustment screw is required for adjustments and only one clamping nut for clamping in the cutting plate, and which therefore opens up the possibility of miniaturizing the tool and using it for precision working of small diameter bores.

Various advantageous modifications of the basic arrangement according to the invention likewise are disclosed.

A form locking fastening of the cutting plate to the basic tool body can be realized according to an advantageous embodiment of the invention if the tool is constructed with the following features: (a) the adjustment screw is disposed at an acute angle relative to the supporting shoulder of the basic tool body and engages in a clamping nut which is rotatably mounted on the basic tool body but is axially supported in one direction; (b) the adjustment screw is provided with an axial clamping shoulder facing the angle vertex and urged against an axial counter-shoulder facing the opening of the angle on the cutting plate in contact with the supporting shoulder; and (c) the adjustment screw is provided with a longitudinal section that is arranged eccentric to the screw axis while its eccentric circumferential face forms a radial clamping shoulder which presses against a radial counter-shoulder extending parallel to the screw axis on the cutting plate lying against the supporting shoulder. A tool of such a configuration is suitable for high-speed work because the centrifugal force acting on the cutting edge when the tool is revolving acts against the axial clamping shoulder of the adjustment screw so that the form lock is reliably retained. The cutting plate can be given such a configuration that the centrifugal force vector acting on its center of gravity goes through the region of the supporting shoulder of the basic tool body. There further results the advantage that after release of the clamping nut, the cutting plate flips out of the plate seat and can be removed without it being necessary to remove the adjustment screws and clamping nuts completely from the basic tool body.

According to preferred features of the invention, the clamping nut is disposed at the end of the adjustment screw associated with the angle vertex and is axially supported at the basic tool body in the direction of the angle opening; the clamping nut is mounted in an outwardly open cylindrical recess of the basic tool body; and the axial clamping shoulder of the adjustment screw is formed at the transition of a screw head provided with engagement surfaces for an adjustment tool to an eccentric shaft section forming the radial clamping shoulder. These features result in a tool in which the adjustment screw and the clamping nut are easily accessible and which therefore can be manipulated with particular ease during the exchange, adjustment and tightening of a cutting plate.

The cutting plate can be secured against rotation about an axis perpendicular to the supporting shoulder of the basic tool body, for example, by the provision of shoulders at the basic tool body which coact with the end faces of the cutting plate. However, particularly in connection with longer cutting plates, it may be of advantage to provide two adjustment screws next to one another to adjust and clamp in the cutting plate. In that case, different adjustments of the adjustment screws permits the cutting edge of the cutting plate to be set, within limits, at an angle to the tool axis.

For tools for working stepped bores, it is possible to advantageously realize an axial setting of the cutting plate by providing an adjustment element for adjusting the cutting plate in the axial direction, with the adjustment element being supported in the basic tool body so as to be rotatable therein transversely to the longitudinal extent of the basic tool body, and a conversion element which converts the transverse movement into a longitudinal movement.

BRIEF DESCRIPTION OF THE DRAWINGS

One embodiment of the invention is illustrated to an enlarged scale in the drawing figures and will be described in greater detail below.

FIG. 1 is a top plan view of a grinding tool or fine drilling tool including a cutting plate that is adjusted and fastened by two adjustment screws;

FIG. 2 is a side elevational view of the tool of FIG. 1;

DETAILED DESCRIPTION OF THE PREFERRED EMBODIMENT

Figure 3:
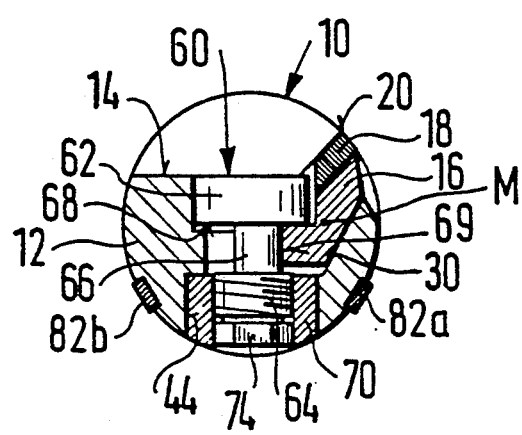
FIG. 3 is a sectional view along line III—III of FIG. 2.

The tool has as its basic body a drill rod 10 whose front end section 12 is provided with a flattened portion 14 and carries a cutting plate 16 which is exchangeably fastened to drill rod 10 by the means to be described below. Cutting plate 16 is configured as a carrier for a cutting strip 18 of a highly wear resistant material that is fastened to cutting plate 16 rigidly or possibly also exchangeably, for example by way of a dovetail guide. However, cutting plate 16 could also itself be made of a wear resistant material and directly form the cutting strip or be provided with a cutting edge 20.

Figure 4:
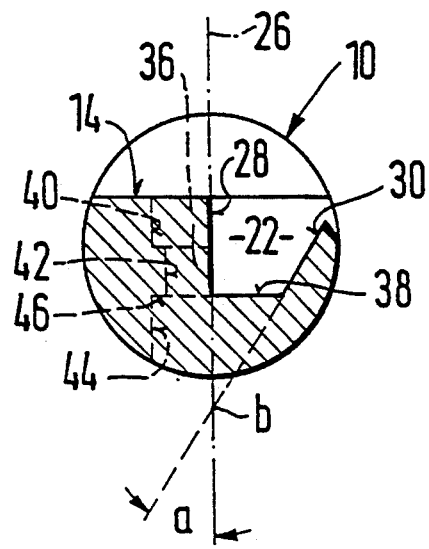
FIG. 4 is a sectional view through the drill rod of the tool along line IV—IV of FIG. 1.
Figure 5:
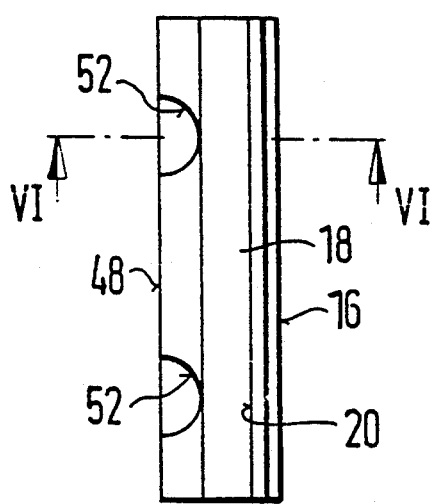
FIG. 5 is a top plan view of the cutting plate of the drill.
Figure 6:
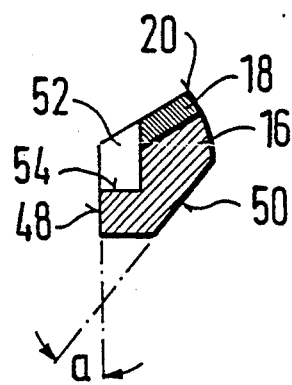
FIG. 6 is a sectional view along line VI—VI of FIG. 5.

In the region of flattened portion 14, drill rod 10 is provided with a recess 22 (FIG. 4) which begins in the cross-sectional plane 24 (FIG. 1) of drill rod 10 and extends to its front end. Recess 22 is delimited by a longitudinal wall 28 that lies at least approximately in a diagonal plane 26 and, on the other side, by a longitudinal wall 30 disposed at an acute angle a to diagonal plane 26 while forming a supporting shoulder for cutting plate 16. In addition to the elongate recess 22, the cross-sectional planes 32 and 34 (FIG. 1) of drill rod 10 are each provided with a passage 36 that starts at flattened portion 14 and ends at the opposite circumferential wall of drill rod 10. Above the bottom wall 38 of recess 22, the passage is provided with a semi-cylindrical section 40 of a larger diameter and subsequent thereto with a semi-cylindrical section 42 of a smaller diameter. Below bottom wall 38, the passage forms a fully cylindrical bore section 44. At a clamping shoulder 46, the latter changes into the semi-cylindrical section 42 of passage 36.

Cutting plate 16 is a prismatic body defined in the longitudinal direction, among others, by two side walls 48, 50 that are arranged at the same angle a relative to one another as the longitudinal walls 28, 30 of recess 22 in drill rod 10. At two locations whose axial distance corresponds to the distance between the two cross-sectional planes 32, 34 of drill rod 10, cutting plate 16 is provided with semi-cylindrical recesses 52 which extend from the top down to a clamping shoulder 54. The radius of recesses 52 corresponds to the radius of sections 40 of passages 36 in drill rod 10 so that, once cutting plate 16 has been inserted into the recess 22 of drill rod 10 and its side wall 50 lies against the longitudinal wall 30 of recess 22, pairs of oppositely disposed sections 40 and recesses 52 supplement one another to form cylindrical pockets.

To adjust and clamp in cutting plate 16, two adjustment screws 60 are provided which each include a head 62, a concentrically arranged threaded section 64 and an eccentric shaft section 66 therebetween, which changes at the top at an annular shoulder 68 into head 62 and whose eccentric circumferential face forms a clamping shoulder 69. Threaded section 64 engages in a clamping nut 70 that is rotatably mounted in bore section 44 of passage 36 and is supported at clamping shoulder 46. A recess 72 is provided in the head 62 of each adjustment screw 60 for the mating engagement of a hexagonal key; at their lower inner edges, clamping nuts 70 are likewise provided with engagement surfaces 74 for a tool to turn the clamping nuts. An adjustment or element screw 76 is provided to axially displace cutting plate 16. This screw is mounted in a threaded bore disposed transversely to the tool axis 78 and pushes by way of a ball 80 against cutting plate 16.

In the region of cutting plate 16, drill rod 10 is provided with two guide strips 82a and 82b which, like cutting edge 20, radially slightly project beyond the exterior surface of drill rod 10 and guide drill rod 10 in the bore. A guide strip 82b disposed diametrally opposite cutting edge 20 additionally determines, by way of its distance from cutting edge 20, the diameter of the bore to be produced. By way of a guide strip 82a, the working pressure is absorbed and is transferred directly to the workpiece. Instead of employing guide strips, individual circumferential sections of the drill rod itself formed between segment-like ground surfaces at drill rod 10 may provide the guidance. Channels 84, 86 are provided in drill rod 10 for the supply of coolant to cutting strip 18 and for the removal of chips.

In order to insert, adjust and clamp in cutting plate 16, the two adjustment screws 60 are initially turned upward, while holding on to clamping nuts 70, until cutting plate 16 is pivoted underneath the heads 62 of adjustment screws 60 and can be placed against the longitudinal wall 30 of drill rod 10 forming the supporting shoulder. Then, the height position of cutting plate 16 relative to longitudinal wall 30 and thus the radial distance of cutting edge 20 from the tool axis, and possibly also the angle relative to the tool axis, can be varied and set to desired values by rotation of adjustment screws 60. Theses values are a function of the radial distances of the clamping shoulders 69 formed at the eccentric shaft sections 66 of adjustment screws 60 from the screw axes (diagonal plane 26, FIG. 4), which push cutting plate 16 more or less far away from the screw axes to thus displace it upwardly on longitudinal wall 30.

To adjust or preset the desired position of the cutting strip relative to the tool axis, drill rod 10 may be held between the two tips of an adjustment device that engages in the two openings of channel 84 and the set dimension can be checked by means of two measuring gauges. If adjustment screws 60 have been brought into the prescribed rotary position, clamping nuts 70 are tightened while holding on to adjustment screws 60. This causes the axial clamping shoulders 68 at adjustment screws 60 to urge cutting plate 16 firmly against the longitudinal wall 30 of drill rod 10. The center of gravity of cutting plate 16 together with cutting strip 18, indicated in FIG. 3 by the point M, is selected so that the centrifugal force vector acting on it passes through the region of the longitudinal wall 30 of drill rod 10.

As an adjustment aid, markers may be provided at adjustment screws 60 and at the surface regions of drill rod 10 surrounding the screws. Moreover, stops may be provided at adjustment screws 60 and on drill rod 10 so as to delimit the adjustment range of adjustment screws 60.

The fastening of the cutting plate according to the invention may of course also be provided for multiple and stepped tools for the simultaneous working of interior and exterior contours of workpieces.

We claim:

1. A cutting tool for working the interior and exterior contours of workpieces, with said tool comprising at least one cutting plate exchangeably fastened to a basic tool body and being adjustable radially to the tool axis by means of an adjustment screw, while being clampable by clamping means to a supporting shoulder of the basic tool body that absorbs the working pressure, and wherein, for radial adjustment of the cutting plate, the adjustment screw simultaneously constitutes a clamping means for clamping the cutting plate tightly to the supporting shoulder of the basic tool body and has the following features:

(a) the adjustment screw is disposed at an acute angle relative to the supporting shoulder of the basic tool body and engages in a clamping nut which is rotatably mounted on the basic tool body but is axially supported in one direction;

(b) the adjustment screw is provided with an axial clamping shoulder facing the vertex of the acute angle and urged against an axial counter-shoulder facing the opening of the angle on the cutting plate in contact with the supporting shoulder; and (c) the adjustment screw is provided with a longitudinal section that is arranged eccentric to the screw axis while its eccentric circumferential face forms a radial clamping shoulder which presses against a radial counter-shoulder extending parallel to the screw axis on the cutting plate lying against the supporting shoulder.

2. A cutting tool according to claim 1, wherein the clamping nut is disposed at an end of the adjustment screw associated with the vertex of the acute angle, and is axially supported at the basic tool body in the direction of the angle opening.

3. A cutting tool according to claim 2, wherein the clamping nut is mounted in an outwardly open cylindrical recess of the basic tool body.

4. A cutting tool according to claim 1 wherein the axial clamping shoulder of the adjustment screw is formed at a transition of a screw head which is provided with engagement surfaces for an adjustment tool, to an eccentric shaft section forming the radial clamping shoulder.

5. A cutting tool according to claim 1, wherein the cutting plate is elongated, and two juxtaposed adjustment screws are provided to adjust and clamp in the elongated cutting plate.

6. A cutting tool according to claim 1, wherein the cutting plate is adjustable in the axial direction by way of an adjustment element which is supported in the basic tool body so as to be rotatable therein transversely to the longitudinal extent of the basic tool body, and a conversion element which converts the transverse movement into a longitudinal movement.

7. A cutting tool according to claim 6, wherein said adjustment element is a screw and said conversion element is a ball.

8. A cutting tool for working the interior and exterior contours of workpieces, with said tool comprising at least one cutting plate exchangeably fastened to a basic tool body and being adjustable radially to the tool axis by means of at least one adjustment screw, while being clampable by clamping means to a supporting shoulder of the basic tool body that absorbs the working pressure, and wherein: for radial adjustment of the cutting plate, the at least one adjustment screw simultaneously constitutes a clamping means for clamping the cutting plate tightly to the supporting shoulder of the basic tool body; the cutting plate is elongated; and two juxtaposed adjustment screws are provided to adjust and clamp in the elongated cutting plate.

9. A cutting tool for working the interior and exterior contours of workpieces, with said tool comprising at least one cutting plate exchangeably fastened to a basic tool body and being adjustable radially to the tool axis by means of an adjustment screw, while being clampable by clamping means to a supporting shoulder of the basic tool body that absorbs the working pressure, and wherein: for radial adjustment of the cutting plate, the adjustment screw simultaneously constitutes a clamping means for clamping the cutting plate tightly to the supporting shoulder of the basic tool body; the cutting plate is adjustable in the axial direction by an adjustment element, which is supported in the basic tool body so as to be rotatable therein transversely to the longitudinal extent of the basic tool body, and a conversion element, which converts the transverse movement into a longitudinal movement.

10. A cutting tool according to claim 9, wherein said conversion element is a ball.

* * * * *